United States Patent [19]

Spraggins

[11] Patent Number: 5,209,805
[45] Date of Patent: May 11, 1993

[54] METHOD AND FASTENER SYSTEM FOR JOINING LIGHTWEIGHT PANELS

[76] Inventor: Michael R. Spraggins, 13201 Stairock, San Antonio, Tex. 78248

[21] Appl. No.: 816,218

[22] Filed: Jan. 8, 1992

[51] Int. Cl.⁵ .................. B29C 65/52; B32B 7/08; F16B 39/02
[52] U.S. Cl. ..................... 156/423; 156/92; 156/578; 222/137; 222/333; 411/82
[58] Field of Search ............. 156/423, 578, 91, 92; 222/137, 135, 333; 411/82; 227/14

[56] References Cited

U.S. PATENT DOCUMENTS

| | | | |
|---|---|---|---|
| 2,663,662 | 12/1953 | Graf | 156/92 |
| 3,184,353 | 5/1965 | Balamuth | 156/92 |
| 3,302,832 | 2/1967 | Hardman | 222/333 |
| 3,781,961 | 1/1974 | Schenk | 156/423 |
| 4,538,920 | 9/1985 | Drake | 222/137 |
| 4,767,026 | 8/1988 | Keller | 222/137 |
| 4,871,088 | 10/1989 | Cox | 222/333 |
| 5,033,650 | 7/1991 | Colin | 222/137 |

Primary Examiner—Michael W. Ball
Assistant Examiner—Daniel J. Stemmer
Attorney, Agent, or Firm—Gunn, Lee & Miller

[57] ABSTRACT

A fastener system to join lightweight panels such as honeycomb or foam core panels. The fastener system comprises a unique hollow, threaded fastener pin (12) and drive assembly (18). The drive assembly (18) attaches to an electric drill and is made up of a cartridge housing (14) for carrying a disposable, dual piston (epoxy resin and hardener) cartridge (20), and a plunger assembly, clutch mounted to the cartridge housing (14). The nose (62) of the cartridge (20) is adapted to receive the proximal end of the pin (12). The plunger assembly (16) mounts to the chuck of the drill. The panels are aligned and the pin (12), mounted to the nose (62) of the cartridge housing (14), is placed against the panels at the point to be joined. The drill is activated and the pin (12) is threaded in until its flared, distal end (26) is seated flush against the skin of the panel. The torque increase on the drive assembly (18) caused by such seating disengages the clutch of the plunger assembly (16), causing rotation between the now stationary housing (14) and still rotating plunger (16), driving the plungers (80a) and (80b) into the pistons (80) of the cartridge (20) and injecting the epoxy resin and hardener through a mixing nozzle (21) into and through the hollow pin (12), into the surrounding panel to harden and lock the pin (12) and panels together.

6 Claims, 6 Drawing Sheets

METHOD AND FASTENER SYSTEM FOR JOINING LIGHTWEIGHT PANELS

FIELD OF THE INVENTION

Generally, this invention relates to attaching two or more lightweight panels, such as honeycomb core or foam core panels used for fabricating interiors for aircraft and recreational vehicles, as well as structural members therefore. More particularly, this invention relates to a method and fastener system using a novel hollow, threaded fastener pin and a unique drive assembly for attaching to an electric drill.

BACKGROUND

This invention is particularly suited to joining honeycomb panels, each panel having a cellular core of hexagonal honeycomb sandwiched between lightweight cover sheets. This invention solves the problem of permanently fastening two adjacent panels by using a hollow, threaded pin driven by a unique drive assembly which, when attached to a drill, injects epoxy resin through the pin and into the area surrounding the joint.

The present method of joining composite panels having a structural or Nomex ® honeycomb core is a time consuming and labor intensive means of constructing certain vehicular interior products. These products range from interior bulkheads to cabin furniture such as galleys, tables, closets, and the like. These products are constructed of the lightweight composite panels much in the same fashion as wood cabinetry except for the joining methods which present a problem, since there is no solid core in the panels.

The panels range in thickness generally from ½" to 1-¼" and have fiberglass "pre-preg" (heat activated resin) coated skins or aluminum skins of varying thickness to form a "sandwich." The panels are formed flat or curved over a tool and placed in a large oven under heat and vacuum pressure for a specified period of time. Cabinetry constructed of this material offers high structural strength and good rigidity with the benefit of ultra light weight compared to plywood and other conventional products.

However, the absence of a dense core results in insufficient structural or rigid mass for retaining purchase on a screw or any conventional type of fastener. The present methods of joining such lightweight, honeycomb core composites include epoxy bonding, angle corner brackets with special sandwich panel fasteners, edge bonding with hollow pins set in epoxy and surface bonding overlapping joints. Such methods of joint construction are expensive and time consuming for the following reasons:

1. Panels must be edge-filled with a bonded wood strip or an epoxy filler before final covering.

2. Through-fasteners must be installed through edge filling, or spot filling, or inserting wood in the area to prevent crushing of the core material.

3. Pins or hollow dowels set in epoxy commonly used in tee or angle joining must be installed in four steps. The steps include drilling through the adjoining panels forming the joint. The core is then removed beyond the diameter of the drilled hole in the panel's skin. Panels are positioned with their bores aligned, and the pin inserted. Next, epoxy is mixed and installed to set the pin. The epoxy is allowed to cure for a specified period of time, hardening and joining the panels.

4. Angle extrusion methods of joining panels require the placement of angles (in a fixture) at the corners of adjoining panels. Holes must be drilled first in the flanges of the extrusion and then through the panels with core removed beyond the skin as noted above. Special "through type" fasteners, i.e., Delron ®, are then installed and set in epoxy. These are threaded for receiving conventional machine screws inserted through the angles to cinch the connections.

Applicant's "Drill-Loc ™" system is unique in its method of installation and fastening for several reasons. First, it has its own unique fastener pin with a pilot drill point, having a stepped end which locates and drills the pilot hole and the larger hole while removing core material. Second, the pin is hollow throughout its body and contains drill point jets to dispense epoxy into the hole and around the pin and "set" the pin in the panels. Third, the helical threads of the pin lock the pin to the core material in the panel and help remove core chips from the hole during the drilling phase. Finally, the pin employs a special flange head having dowel holes to couple with a special drill-mounted drive assembly and epoxy container. A slight flare is incorporated in the head of the threaded body to seat the pin into the skin, producing a tight fit and achieving a flush fit with the panel's surface. The head of the pin, having locked itself to the surface skin of the panel via its thread, insures a tight integral connection of the mating panels once the epoxy is cured. These and other unique features of the invention are more fully set forth herein.

Other patents have disclosed methods for joining lightweight panels, such as honeycomb core panels. U.S. Pat. No. 4,370,372 (Higgins et al. 1983) discloses a fastener comprised of a rigid aluminum tube about 2" long and having a diameter of about 5/16", open at both ends, flared at one end and having a series of longitudinal and peripherally spaced apertures along the wall of the tube.

The first step of the method disclosed in the '372 patent is to form coacting bores in the respective honeycomb panels to receive the fastener elements, such as by drilling holes with a conventional electric drill. The drilling step causes a rupture of the honeycomb bores which the drill bit engages. The bores are cleaned out and aligned, the hollow fastener inserted, and a liquid anchoring fluid is pumped or applied through the flared end of the fastener. The liquid forms a continuous column inside the fastener and spreads out of the tube and longitudinally into the ruptured honeycomb regions. The liquid adhesive hardens, forming a unitary column with the hollow tube fastener, thus permanently anchoring the two panels.

In summary, the '372 patent requires: drilling a hole through the work pieces, fly-cutting the core within the panel skins and removing the chips, uncapping and mixing the epoxy, filling the hole with the epoxy mix using first a disposable caulk nozzle and then a spatula, pressing the pin in by hand, wiping off the excess epoxy mix from the panel surface.

It is to be noted that the '372 pin does not mechanically attach itself at the panel skin line, and thus loses strength as the components rely on a thin film of resin lying between the flange and the skin of the panel. The methods and apparatus disclosed in the '372 patent, however, are time-consuming as they require the several discrete steps of drilling, inserting, and injecting the fluid.

The present invention, on the other hand, reduces the steps and time required to join lightweight panels by using a unique threaded pin and a unique drive assembly which, in one step, joins the two panels with the threaded pin and mixes and injects an adhesive fluid, such as epoxy, through the pin into the ruptured cells adjacent to the pin bore.

Thus, it is the object of the present invention to provide a unique method and apparatus for joining lightweight panels.

It is a further object of the present invention to provide a system having a unique pin comprised of a threaded tube, open at one end, with a means for attaching the open end to a unique drive assembly. The system (drive assembly and pin) attached to a drill, will rotatably insert the self-tapping pin through the panels to be joined, and upon seating of the pin head flush with the panel surface, will mix and inject an adhesive fluid, such as epoxy, through the hollow pin out dispersion jets into the panel. The liquid so injected will harden and form a continuous column within the ruptured cells, and around the threaded portion of the pin, thus joining the panels.

It is a further object of the present invention to provide for a unique drive assembly comprising a housing dimensioned to accept a widely available, "off the shelf" epoxy cartridge, the cartridge having two piston-driven reservoirs, one reservoir for the epoxy and one for the hardener. The drive assembly is provided with a means for retaining a unique hollow, self-tapping pin to drill the pin into adjacent lightweight panels and is further provided with a means to drive mixed epoxy/hardener through the pin into the panels for a fixed, permanent joint.

It is a further object of the present invention to provide the unique cartridge housing with a plunger means for clutchably engaging the housing means. The plunger means engages the pistons of the epoxy cartridge. With the clutch of the housing assembly engaged and the pin seated on a nose portion thereof, the drill rotates the assembly until the pin is seated into the panel. Upon seating, the increased torque then disengages the clutch and allows the plunger to force the epoxy and the hardener through a mixing nozzle into the hollow pin. The mixed composition is thus injected through dispensing jets in the nose and/or body of the pin into the shattered honeycomb cells and around the threads of the pin.

Other objects of the invention will become readily apparent to those skilled in the art upon reviewing the specification and claims set forth herein.

BRIEF DESCRIPTION OF THE DRAWINGS

FIG. 1 as illustrated shows the system ready to drive the pin into the panels to be joined.

FIG. 4a is an end view of the plunger assembly

DETAILED DESCRIPTION OF THE PREFERRED EMBODIMENT

These specifications incorporate by reference U.S. Pat. No. 4,370,372. Familiarization is presumed with the work pieces that are the subject of the present invention. The preferred work pieces are lightweight, honeycomb core panels for which a unique fastening system is disclosed to join the panels in any flush or angular relationship.

The panels generally have honeycomb construction comprised of cellular cores sandwiched between stiff, parallel, outer cover sheets or "skins" of, for example, thin aluminum. The core of the panel has thin, rigid, hexagonal cell walls with the outer sheets bonded at either end thereof, creating a sandwich of "closed" cells. Such panels are lightweight and rigid, and frequently used in the aviation and recreational vehicle industries for building interiors.

Figure 1:
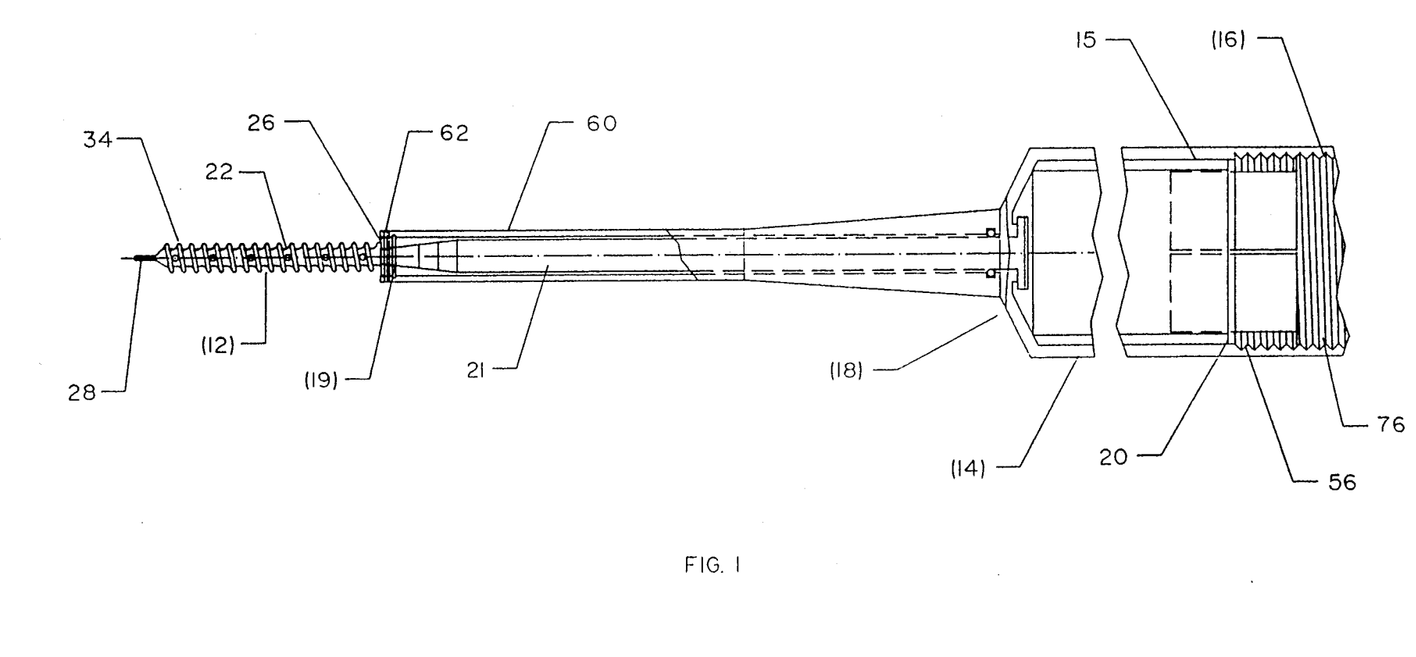
FIG. 1 is a side elevational view of the fastener system showing the pin seated in the nose of the housing cartridge, the housing cartridge having the plunger attached to the removed end thereof.
Figure 2A:
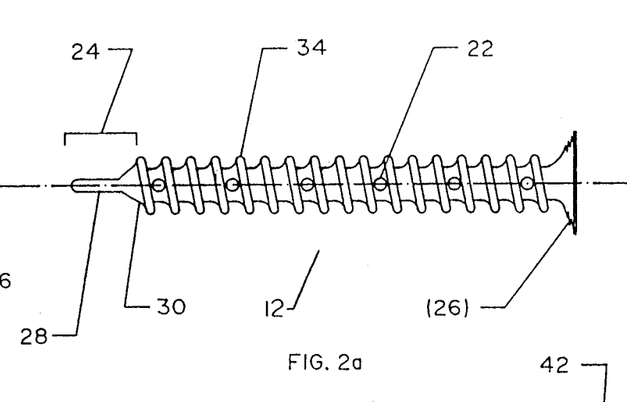
FIGS. 2a, 2b, 2c and 2d are various elevational views of the unique pin of the fastener system.
Figure 3:
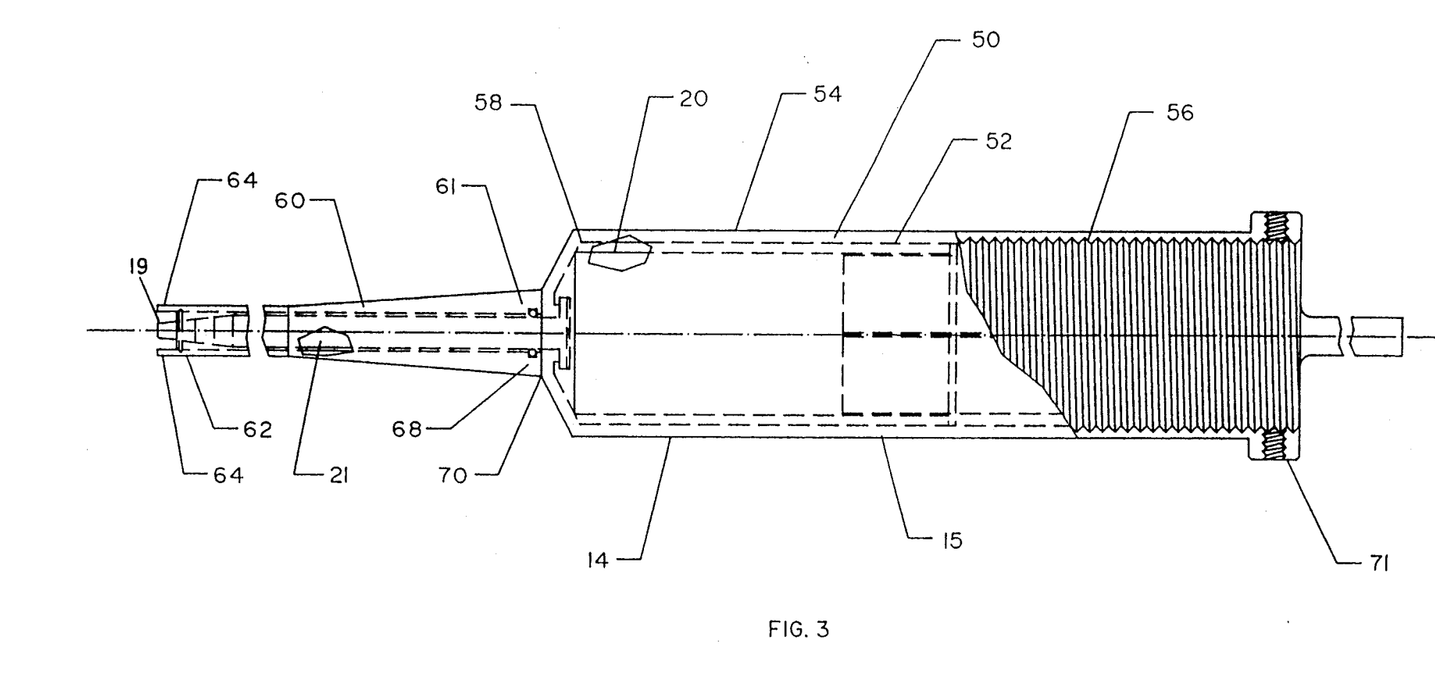
FIG. 3 illustrates an elevational view of the cartridge housing of the fastener system.

FIGS. 1, 2a, and 3 generally disclose a unique pin (12) having a solid, threaded, pilot tip (28) and a body (22), with threads (34) thereon, helically wound from nose to head. Pin (12) has a flared head (26) which is slotted to engage the nose (62) of a cartridge housing (14). Cartridge housing (14) has a body portion (15) dimensioned to receive a double piston epoxy cartridge (20) such as the 3M Model No. DP110. Body portion (15) of cartridge housing (14) has threaded end (56) to receive therein the threaded collar (76) of plunger assembly (16). Distal to threaded end (56) is nose (60), dimensioned to receive a mixing nozzle (21) of the epoxy cartridge.

Thus, as is evident with reference to the drawings, in particular FIGS. 1, 3, 4, and 4b, drive assembly (18) is comprised of cartridge housing (14) with epoxy cartridge (20) enclosed therein and having plunger assembly (16), whose plungers (80a) and (80b) engage the two pistons (80) of the epoxy cartridge (epoxy piston and hardener piston). With stem (78) of plunger assembly (16) secured into a chuck of an electric drill, the assembly with unique pin (12) releasably fastened to the nose of cartridge housing (14), provides a system to easily and quickly join together two lightweight panels with self-tapping pin (12) while the drill is rotating the drive assembly and pin (12). Upon seating of pin (12) into the panels, clutch ring (71) disengages cartridge housing (14), allowing the continued rotation of plunger assembly (16) relative to a now-stationary cartridge housing (14) driving plungers (80a) and (80b) into adjacent piston bores of epoxy cartridge (20).

Figures 3A, 3B, 3C:
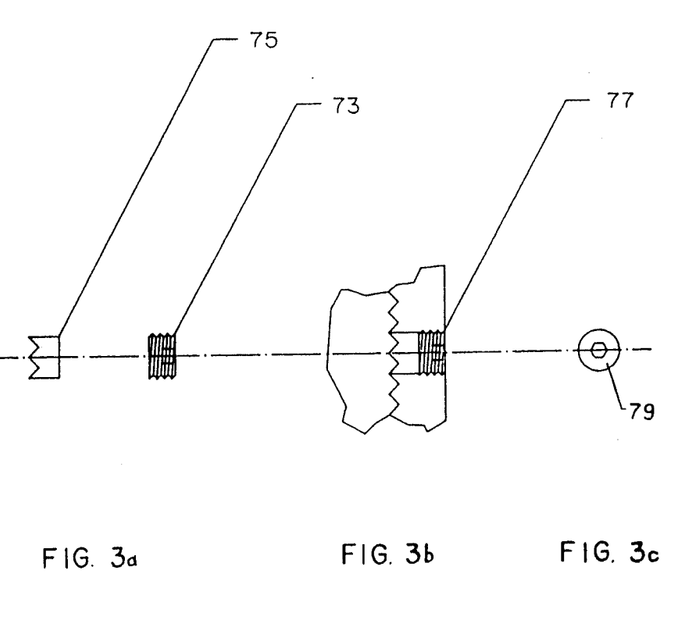
FIGS. 3a, 3b, and 3c illustrate in exploded and convention form an elevational view of one embodiment of a clutch means for use with the fastener system.

FIGS. 3a, 3b and 3c provide details of such a clutch mechanism (77) being comprised of friction block (75), having a surface threaded to generally match threads of threaded collar (76) of plunger assembly (16). Threaded pressure adjustment member (73) has a removed end (79) with an allen key receptor allowing the user to tighten friction block (75) against threaded collar (76) to increase the torque required to disengage the clutch. It is to be noted, however, that other clutch means may be used or no clutch means at all. When using the unique drive assembly without a clutch, friction between body portion (15) and threaded collar (76) is greater than friction encountered in setting pin (12) into the panels. Upon seating of the pin head into or against the surface ("skin") of the panel, the user may simply grab body (15) of cartridge housing (14) while leaving the drill on, causing rotation to occur between housing (14) and plunger (16), thereby driving epoxy/hardener mix into and through pin (12). When mix is observed to be spilling out of the pin bore, the user can shut down the drill, remove the drill, and set the next pin onto nose (62) to begin again.

It can be seen FIGS. 1 and 3 how the epoxy and hardener as liquids are injected through mixing nozzle (21) of the cartridge, thereby combining to form an epoxy mix and into head (26) of the pin. The liquid epoxy mix continues through the core of the pin (12) and out the dispersion jets (32) (located in the nose (24) of pin (12) and/or along body (22)) to spread out to surround and fill the interthread pin spaces and the shattered and ruptured honeycomb cells of the joined panels. Upon the hardening of the epoxy mix, a strong, permanent joint is effected between the threaded portion of the body of the pin and the panels. The setting of the epoxy forms a hard and fast joint in which threaded pin (12) is integrally locked into the epoxy, itself hardened and integral with the ruptured honeycomb cells.

Thus, FIGS. 1 and 3 illustrate the general elements and method of use of the unique system of joining lightweight panels.

Figure 2B:
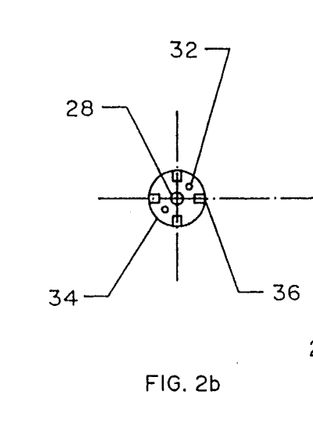

Turning now to FIGS. 2a through 2d, illustrated are details of pin (12) of the present invention. Pin (12) is comprised of an elongated, helically threaded, hollow cylindrical body with a closed end at nose (24) and an open end at head (26). As can be seen in FIG. 2a, nose (24) has a solid, threaded pilot tip (28) joined to body (22) by flared shank (30). Pilot tip (28) drills a pilot hole to help the alignment of the pin with the panels. FIG. 2b illustrates how shank (30) has epoxy dispersion jets (32) in communication with flow channel (46) (FIG. 2c) in the body of pin (12). Threads (34) may have fluting (36) on the perimeter thereof to assist the pin in breaking through the skin of the panels, to help shatter the honeycomb cells, and also to assist in spreading the liquid epoxy composition through and around the tapped bore created by the pin.

Figure 2C:
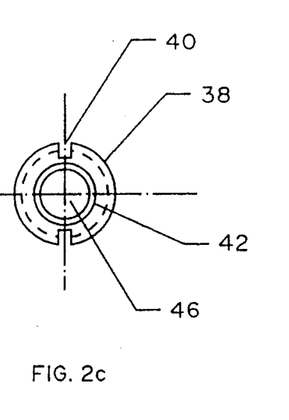
Figure 2D:
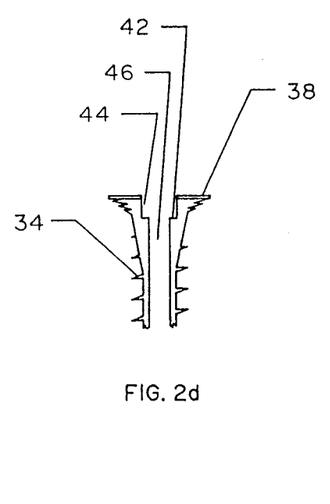

Turning now to FIGS. 2a, 2c, and 2d, it can be seen that flared head (26) of pin (12) has a flat perimeter (38) defining slots (40) therein. The inner circumference of perimeter (38) defines groove (42) as having a wall portion (44) and a floor portion (46). It is also evident from FIGS. 2c and 2d, that head (26) communicates with flow channel (46) to provide means of dispersing the liquid epoxy mix through pin (12) into the adjacent panels. Slots (40) in head (26) are dimensioned to receive dogs (64) on nose (62) of cartridge housing (14). (See, FIGS. 1 and 3.) Groove (42) in head (26) is adapted and dimensioned to receive tip (19) of mixing nozzle (21) of the epoxy cartridge. Tip (19) to groove (42) seal should be sufficient to substantially prevent the liquid epoxy mix from flowing otherwise than through flow channel (46).

FIGS. 1, 3, 3a, and 4 more particularly illustrate drive assembly (18) of the present fastening system. Drive assembly (18) is comprised of two components: cartridge housing (14) and plunger assembly (16). Cartridge housing (14) is threadibly engaged at threaded end (56) with threaded collar (76) of plunger assembly (16). More particularly, it may be appreciated from FIG. 3 that cartridge housing (14) is comprised of a body portion (15) having a beveled end (58) at the removed or distal portion thereof and threaded end (56) at a proximal end thereof. Beveled end (58) is integral with nozzle chamber (60). Nozzle chamber (60) is generally tapered and abuts beveled end (58) at near end (61). Removed end of nozzle chamber (60) comprises nose (62) with dogs (64) mounted thereon, to engage slotted head (26) of pin (12). Near end (61) of nozzle chamber (60) has ball bearings (68) and seal press fit (70) therein. Thus, a dual piston (epoxy and hardener) epoxy cartridge (20) with mixing nozzle (21) thereon slides into body portion (15) against inner surface (52) thereof so that the forward end of the cartridge rides generally flush against the inner surface (52) of the beveled end portion (58). Thus, the inner surface (52) of beveled end portion (58) and ball bearings (68) provide bearing surfaces on which mixing nozzle (21) of rotating cartridge (20) can ride during the injection phase of joining the panels.

Figure 4:
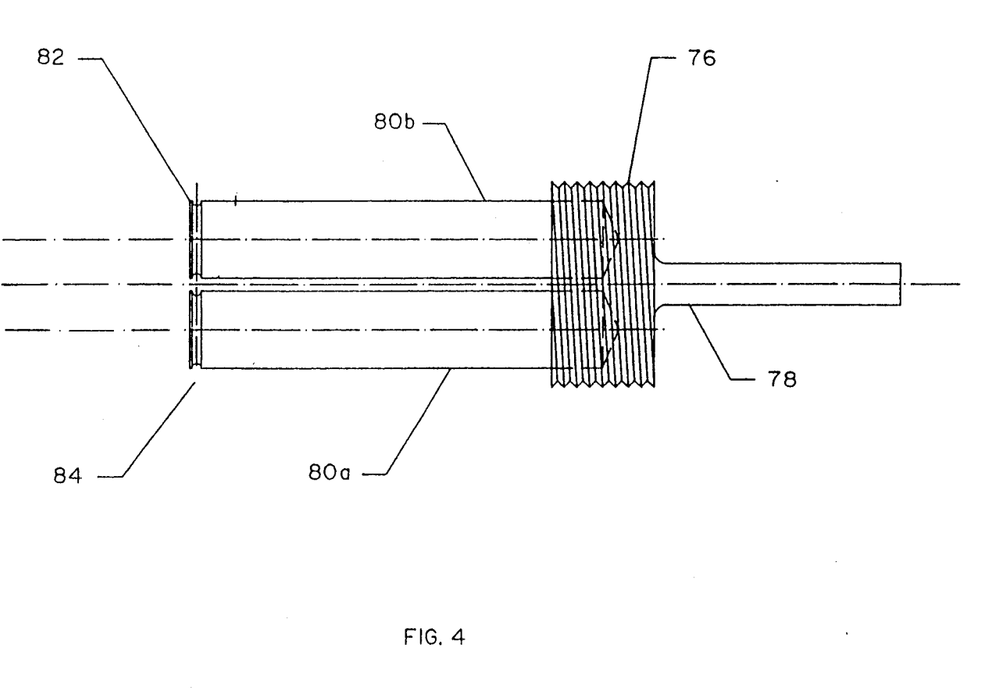
FIG. 4 is an elevational view of the plunger assembly of the fasterner system.
Figure 4A:
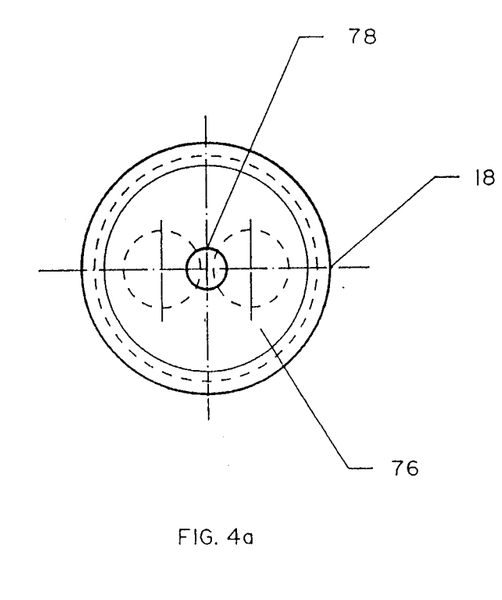
FIG. 4a is an end view of the plunger assembly of the fasterner system installed in the drive assembly.
Figure 4B:
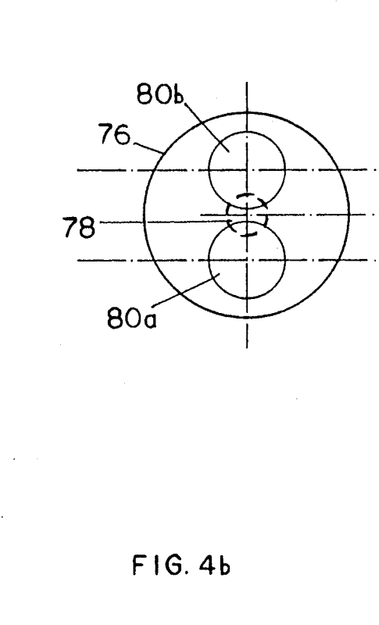

Turning now to FIGS. 4 and 4a, details of plunger assembly (16) may be appreciated. Plunger assembly (16) has cylindrical stem portion (78) designed to fit into a chuck of an electric drill. Integral with stem portion (78) is threaded collar (76), dimensioned to threadibly engage threaded end (56) of cartridge housing (14). Integral with stem (78) and threaded collar (76) are plunger shafts (80a) and (80b). As can be seen in FIG. 4, plunger shafts (80a) and (80b) have grooves (82) at a removed end thereof into which fit O-rings (84). Cylindrical plunger shafts (80a) and (80b) are dimensioned to fit comfortably within the drive piston bores (80) of cartridge assembly (20). O-rings (84) help provide a snug, sealed fit and prevent the escape of epoxy or hardener.

Method of Use of the System

Attach the 3M (or other) mixing nozzles to the 3M (or other brand) dual piston epoxy cartridge. Insert the nozzle/cartridge into the cartridge housing to seat against the O-ring seal in the nose of the cartridge housing.

Insert the plunger assembly into the cartridge housing until the plungers engage the drive piston bores of the epoxy and hardener reservoirs. Engage the threaded portion of the driver plunger with threads in the cartridge housing.

Chuck the drive assembly (cartridge housing and plunger) to an electric drill, preferably a variable speed drill. Engage the slots and the flanged pin head to the dogs of the nose of the housing. Align the work pieces and align the panel pin to the work pieces. Start the drill and the pin will now drill its own pilot hole. As the pin continues drilling into the work pieces, the threaded flange on the skin will screw itself into the skin of the panel surface.

The clutch (if one is used) is preadjusted to disengage upon seating of the flared head of the pin into the panel skin surface. Upon such disengagement the drill will continue to rotate the plunger portion of the drive assembly into the cartridge housing, thereby driving the pistons in each of the epoxy and resin cartridge reservoirs through the mixing nozzle and into the pin. The mixed resin is extruded through the dispersion jets of the pin in the head and/or in the shank portion of the fastener pin and forced back through and around the fluted edges and threads of the pin into the void areas and shattered regions around the cells of the panels. The cured resin forms a strong bond between the pin and core material, making the pin integral with the core and the panel skin.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

I claim:

1. A drill driven system for fastening lightweight panels together with epoxy, the system comprising:
 a hollow, cylindrical, threaded pin having a body, a closed-ended nose portion and an open end with a flared head, the pin having dispersion jets therein and the head having first attachment means thereon;
 an epoxy cartridge having a piston driven resin reservoir and a piston-driven hardener reservoir;
 a mixing nozzle attached to said epoxy cartridge and in communication with the reservoirs of said epoxy cartridge for mixing the resin and the hardener;
 housing means dimensioned to accept the epoxy cartridge with the mixing nozzle attached thereto, said housing means having a first end and a second end, the second end for receiving the mixing nozzle, the second end having a second attachment means thereon, the second attachment means for coupling with the first attachment means on the head of said pin;
 plunger means capable of engaging the pistons of said epoxy cartridge, said plunger means capable of releasably engaging a drill said drill having a drill chuck and
 clutch means for operatively engaging said housing means and said plunger means such that rotation of the drill chuck with said clutch engaged rotates said housing means with said pin mounted thereon into the lightweight panels to be joined and that rotation of the drill chuck with the clutch disengaged rotates the plunger means without rotating said housing means, thereby forcing epoxy through the mixing nozzle, through the pin, and through the dispersion jets of the pin and into the panels to be joined.

2. The system of claim 1 wherein said pin further comprises means to drill a pilot hole in the panels, said drilling means integral with said pin.

3. The system of claim 1 wherein said first attachment means of the head of said pin is a pair of slots opposedly positioned along a perimeter of the head and the second attachment means of said housing is a pair of dogs, dimensioned to fit snugly within the pair of slots.

4. The system of claim 1 wherein the first end of said housing means is threaded and said plunger means is threaded to match the threads of said housing means and to rotatably couple said housing means to said plunger means.

5. The system of claim 1 wherein the plunger means includes a pair of cylindrical members dimensioned for receipt with the reservoirs of said epoxy cartridge.

6. The system of claim 1 wherein the threads of said pin are helically wound around the body of said pin and contain fluting along the perimeter thereof.

* * * * *